T. H. SCHROR.
AUTOMATIC TRAFFIC SIGNAL.
APPLICATION FILED SEPT. 14, 1916.
1,231,949.
Patented July 3, 1917.
2 SHEETS—SHEET 1.
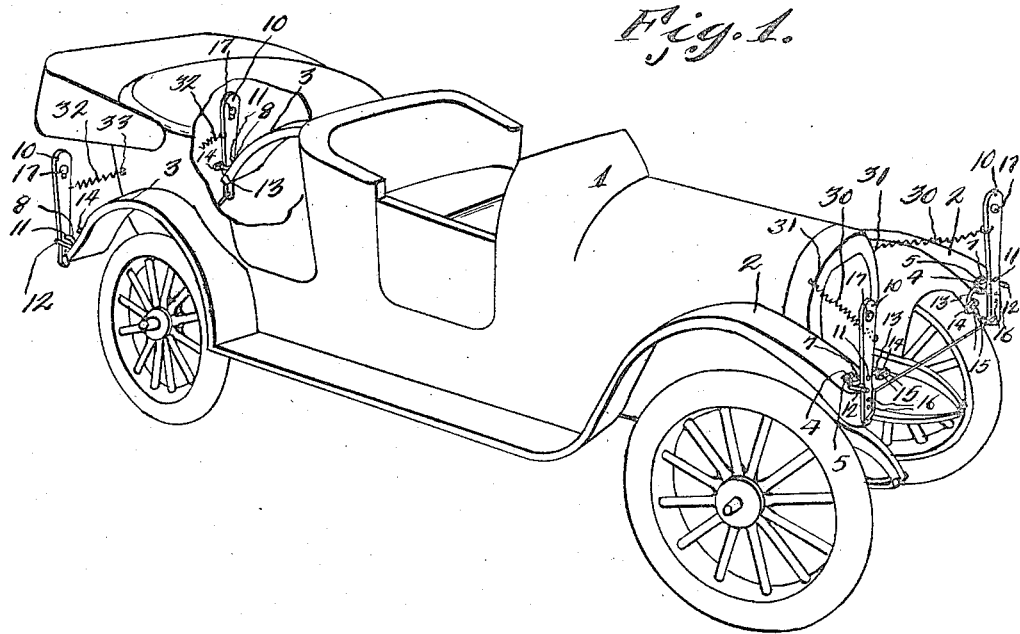
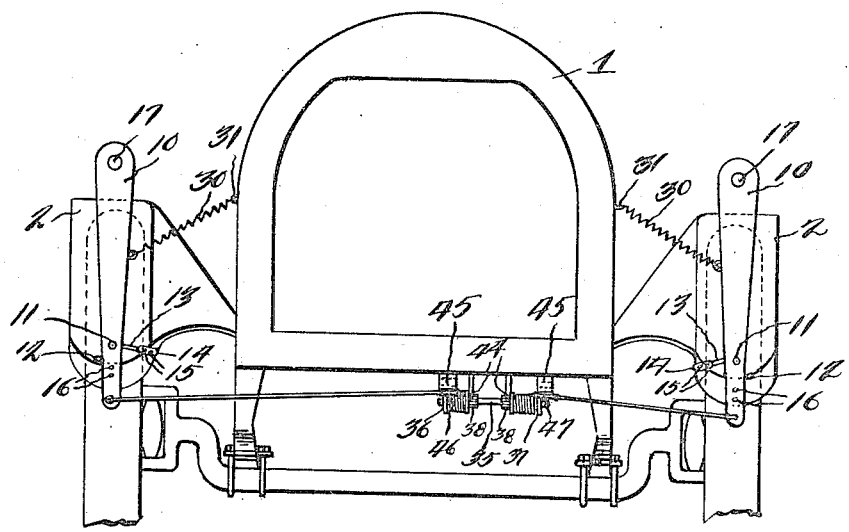

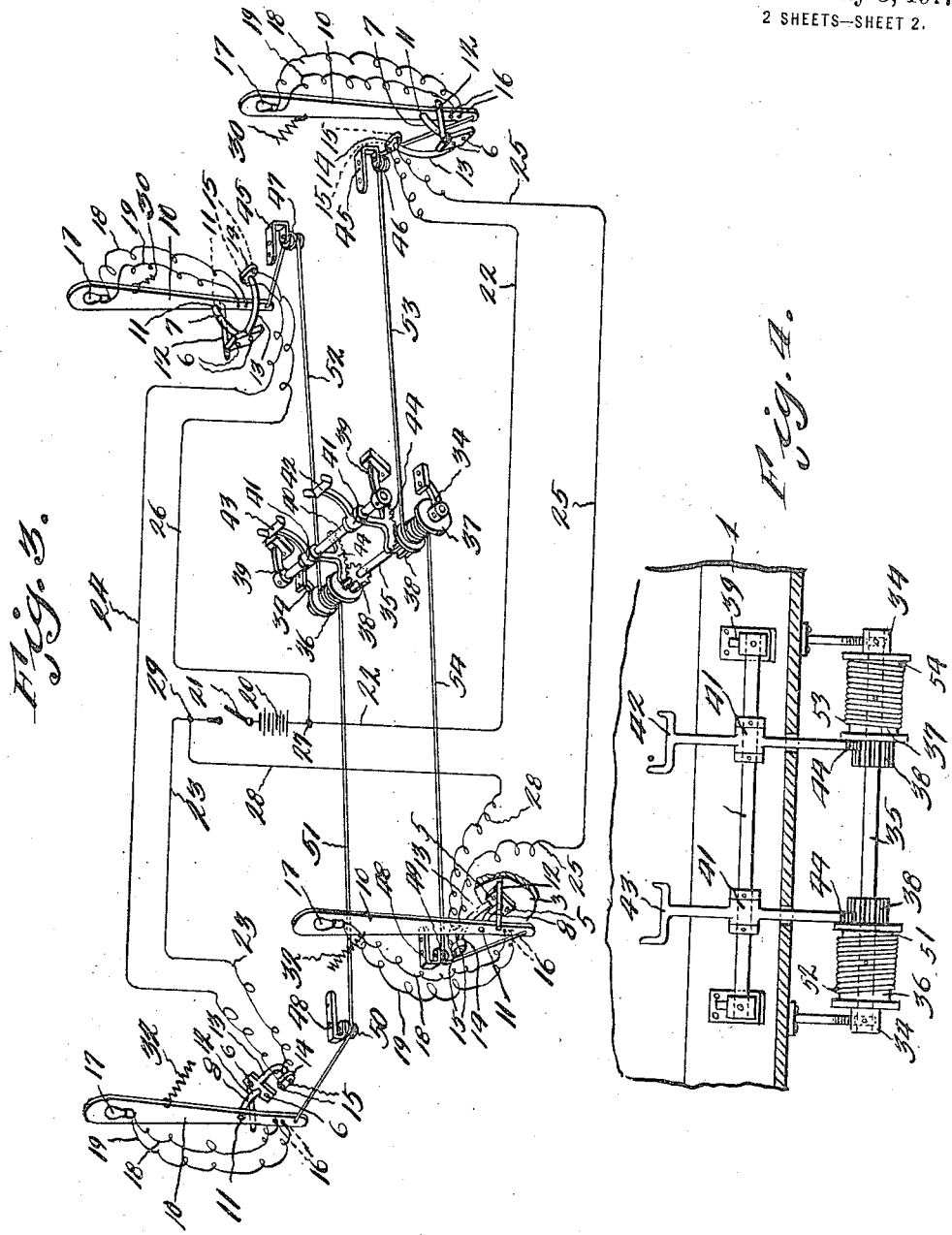

UNITED STATES PATENT OFFICE.

THEODORE H. SCHROR, OF CALEDONIA, NEW YORK.

AUTOMATIC TRAFFIC-SIGNAL.

1,231,949.

Specification of Letters Patent.

Patented July 3, 1917.

Application filed September 14, 1916. Serial No. 120,114.

*To all whom it may concern:*

Be it known that I, THEODORE H. SCHROR, a citizen of the United States, residing at Caledonia, in the county of Livingston, State of New York, have invented a new and useful Automatic Traffic-Signal; and I do hereby declare the following to be a full, clear, and exact description of the invention, such as will enable others skilled in the art to which it appertains to make and use the same.

This invention relates to an improved automobile traffic signal, and an object of the invention is to provide a signal of this kind to indicate to the traffic officer in front whether the machine will turn to the right or the left, and indicate to the following machine one direction or the other.

A further object of the invention is to provide a device of this kind having improved features of construction.

One of the features of the invention is to provide a pair of indicators for the front, one upon each side, and a pair for the rear of the automobile, one upon each side, in combination with means manually actuated, whereby the right or the left indicators may be simultaneously actuated.

A further feature of the invention is the provision of electric bulbs on said indicators including electric circuits, one for the right indicators and one for the left indicators there being circuit closers, one for each indicator and consisting of stationary and movable contacts for closing said respective circuits, when the indicators are operated, to light the bulbs.

In practical fields, the details of construction may necessitate alterations falling within the scope of what is claimed.

The invention comprises further features and combination of parts, as hereinafter set forth, shown in the drawings, and claimed.

In the drawings:—

Figure 1 is a view in perspective of an automobile, showing the traffic signal applied thereto and constructed in accordance with the invention.

Fig. 2 is a view in front elevation of the automobile, showing the front signal.

Fig. 3 is an enlarged perspective view of the automobile traffic signal detached from the automobile, and illustrating the respective circuits.

Fig. 4 is a view partly in elevation and partly in section, showing the means for manually actuating the signals or indicators.

Referring more especially to the drawings, 1 designates an automobile of the usual construction, and 2 and 3 denote the forward and rear wheel guards. On the extremity of each forward guard and upon the extremity of each rear guard, a plate 4 may be secured, by passing bolts or the like 5 through the openings 6 of said plate, and through the guard. Projecting forwardly from each of the forward plates 4 is a bracket arm 7, and extending rearwardly from each of the plates 4 of the rear wheel guards is a bracket arm 8, and to the extremity of each arm 7 and 8, an indicator or signal blade 10 is pivoted, as shown at 11. Projecting from each plate 4 is a lug 12, with which the indicator blade may contact, to limit the blade in either vertical or horizontal positions. The tail of the blade contacts with the lug 12 to limit the blade in a vertical position, while a portion of the body of the blade contacts with the lug to limit the blade in a horizontal position. Projecting inwardly from each of the plates 4 is an arm 13 having a plate 14 at its extremity. Each of the plates 14 have contacts 15, and a portion of the tail of each indicator blade is provided with contacts 16. The free end portion of the body of each indicator blade has an electric light bulb 17, there being wires or leads 18 and 19 connecting the contacts 16 and the bulb. A conventional form of battery 20 is provided, and a switch 21. A wire or lead 22 connects the battery and one of the contacts 15 at the forward right hand portion of the automobile, and a wire or lead 23 (in which the switch 21 is located) connects the other side of the battery and one of the contacts 15 at the rear left hand side of the automobile. A lead or wire 24 connects the corresponding contacts 15 at the forward and rear left hand side of the automobile. A lead 25 connects the corresponding contacts 15 at the forward and rear right hand side of the automobile. A wire 26 extends from the junction 27 with the wire 22, and is in turn connected to one of the contacts 15 at the forward left hand side of the automobile. A lead 28 extends from its junction 29 with the lead or wire 23 and is in turn connected to one of the contacts 15 at the rear right hand side of the machine. The forward indicator blades have connected thereto springs 30, each of which in turn is connected at 31 to the hood of the automobile. The rear indicator blades have connected thereto springs 32. Each spring 32 in turn is connected at 33 to the body of the automobile. Mounted in bearings 34 depending from the under side of the body of the machine is a shaft 35, on which the drums 36 and 37 are revolubly mounted. Each drum is provided with a gear 38. Bearing brackets 39 are mounted upon the foot rise, which is forward of the front seat of the automobile, and mounted in said bearing brackets 39 is a shaft 40, on which the sleeves 41 of the foot pedals 42 and 43 are revolubly mounted. Projecting downwardly from the sleeves 41 are segment racks 44, which mesh with the gears 38 of the drums 36 and 37. Carried by the brackets 45 of the forward part of the body of the machine are pulleys 46 and 47. Secured to the rear of the body of the machine are brackets 48, which carry pulleys 49 and 50. A cable 51 has one end connected to the tail of the indicator blade of the rear left hand side of the machine, and passes over the pulley 50, and has its other end portion wound around the drum 36. A cable 52 is provided, and has one of its ends wound around the drum 36 opposite the cable 51. The cable 52 passes over the pulley 47, and has its other end connected to the tail of the indicator blade of the forward left hand side of the machine. A cable 53 has one end portion wound around the drum 37, and its other end portion passed about the pulley 46, and is in turn connected to the tail of the forward right hand indicator blade. Winding about the drum 37 in a direction opposite the cable 53, is the cable 54, which, in turn, passes about the pulley 49, and has its end portion connected to the tail of the rear right hand indicator blade. It is to be noted that by depressing the foot pedal 42, the cables 53 and 54 will wind upon the drum 37, thereby to throw or move the forward and rear indicator blades to horizontal positions, thereby indicating to the traffic officer in front and the machine following in the rear that the automobile will turn to the right. When traveling at night, the switch 21 is closed, hence, when the forward and rear right hand indicator blades are thrown to horizontal positions against the actions of the springs 30 and 32, the contacts 15 and 16 of the forward and rear right hand signals electrically connect, thereby closing a circuit over the wires or leads 22, 25 and 28, thereby lighting the bulbs 17 of the forward and rear right hand indicator blades. When the foot pedal 43 is depressed, the forward and rear left hand indicator blades are correspondingly operated, and when traveling at night, the switch 21 having first been closed, the contacts 15 and 16 of forward and rear left hand signals are brought into coöperation, thereby closing an electric circuit over the wires or leads 23, 24 and 26, lighting the bulbs of the forward and rear left hand indicator blades, which will disclose the left hand direction of the automobile, to the traffic officer in front and the machine traveling in the rear. The lugs 12 will act to limit the indicator blade in their horizontal or vertical positions.

The invention having been set forth, what is claimed as new and useful, is:—

In an automobile traffic signal, forward and rear right and left hand indicators, brackets for the indicators, said brackets comprising plates adapted for attachment to the forward and rear guards of an automobile, arms projecting from the plates and pivotally supporting the indicators and lugs also projecting from the plates and adapted for contact alternately with the tails and bodies of the indicators to limit the latter to vertical and horizontal positions respectively, a rotatable drum for each pair of forward and rear indicators, cables connecting each pair of indicators with their attendant drum, a gear attached to each drum, a rockable arm for each drum having a toothed sector meshing with the gear attached to that drum, whereby either drum may be rotated and its attendant indicators brought to horizontal positions, and resilient members connecting with the indicators holding them normally in vertical positions.

In testimony whereof I have signed my name to this specification in the presence of two subscribing witnesses.

THEODORE H. SCHROR.

Witnesses:
C. C. CONNOR,
ANNA E. MONROE.